(12) United States Patent
Zimmerman (10) Patent No.: US 8,342,552 B1
(45) Date of Patent: Jan. 1, 2013

(54) SELF ADJUSTING BICYCLE

(76) Inventor: Felton Zimmerman, Tampa, FL (US)

( * ) Notice: Subject to any disclaimer, the term of this patent is extended or adjusted under 35 U.S.C. 154(b) by 93 days.

(21) Appl. No.: 12/932,588

(22) Filed: Mar. 1, 2011

Related U.S. Application Data (60) Provisional application No. 61/339,427, filed on Mar. 4, 2010.

(51) Int. Cl.
*B62K 3/02* (2006.01)

(52) U.S. Cl. ......... 280/220; 280/221; 280/288; 280/284

(58) Field of Classification Search .................. 280/220, 280/221, 288, 284
See application file for complete search history.

(56) References Cited

U.S. PATENT DOCUMENTS

| 7,635,141 | B2 * | 12/2009 | O'Connor | 280/284 |
| 8,201,841 | B2 * | 6/2012 | Beale et al. | 280/284 |
| 2007/0210555 | A1 * | 9/2007 | O'Connor | 280/284 |

* cited by examiner

*Primary Examiner* — Lesley D Morris
*Assistant Examiner* — Marlon Arce (57) ABSTRACT

Multiple pivot points on a bicycle frame provide for automatic adjustment of the saddle of the bicycle during usage of the bicycle within a range of positions. The bicycle will normally position the saddle in a neutral position area of the range of positions during steady pedaling over level ground. During sprinting the bicycle will position the saddle in a sprinting position area of the range of positions where the saddle raises and moves forward to maintain contact with the rider to support the rider. During downhill riding the bicycle will position the saddle in a downhill position area of the range of positions where the saddle drops and moves rearward while supporting the rider. A saddle locking assembly permit the rider to prevent the saddle from raising to permit the rider to raise off of the saddle when desired.

20 Claims, 8 Drawing Sheets

SELF ADJUSTING BICYCLE

CROSS-REFERENCE

This application claims priority to Provisional Application No. 61/339,427 filed Mar. 4, 2010 and entitled Self Adjusting Bicycle.

BACKGROUND

1. Field of the Invention

Generally, the invention relates to bicycles which have some relative movement of portions of the frame to automatically adjust the bicycle during use to conform to some operational circumstance. More specifically, the invention relates to such bicycles which have a plurality of pivot points positioned about the frame and which automatically adjust a saddle position to attempt to maintain contact of the saddle to the rider during use of the bicycle.

2. Description of the Prior Art

Numerous types and styles of bicycles exist. The term bicycle as used herein refers to all mechanical devices which a rider sits upon and which is powered to transport the rider utilizing energy provided by movement of the rider's legs. While the vast majority of such devices are true bicycles, in that they have two (2) wheels, those with one (1) wheel and those with three (3) or more wheels are intended to be included. The common characteristic being that they support a rider on a seat or saddle and are powered by movement of the rider. Typically the energy of the rider is transferred to opposing orbital pedals which cooperate to rotate a common joining shaft. The vast majority of bicycles are powered through such pedals by application of alternating pressure provided by movement of the rider's legs and applied by contact of the rider's feet with the respective opposing pedals.

Conventional bicycles will have certain definable components. These include a frame which support the rest of the components. A steering assembly is rotatably secured relative to the frame and has attached thereto handlebars for manipulation by the rider to steer the bicycle. Typically brake levers are attached to the handlebars for manipulation by the rider to brake the bicycle. A front wheel is rotatably attached to the steering assembly. A pedal assembly is secured to the frame and has opposing foot pedals to permit the rider to impart rotational power to propel the bicycle. A rear wheel is rotatably secured relative to the frame. Typically a chain is utilized to transfer rotational power from the pedal assembly to the rear wheel. Often multiple gears are provided on the rear wheel or on both the rear wheel and the pedal assembly to permit the rider to select a transfer ratio. Control of such transfer ratio is typically provided on the handlebars in the form of a gear lever or levers which are manipulated by the rider to select a desired transfer ratio during use of the bicycle. A saddle is secured relative to the frame to support the rider. It is well known to provide for adjustments to an orientation of various components attached to the frame of bicycles. Typically such adjustments provide for movement of a respective component within a range of movement with secure anchoring of the component at the desired placement location within the range of movement. Such adjustments provide for configuring the bicycle for optimum comfort and performance for a specific rider. It is known to provide for wide ranging adjustment to certain components. An excellent example resides in adjustment of position of the saddle where it is known to provide for elevational adjustment in a vertical orientation along the height of the bicycle, often at an angle, a placement along the length of the bicycle in a general horizontal orientation and an angular orientation of the contact surface of the saddle. These three (3) adjustments of the saddle provide for a specific bicycle to be configured to place the rider at an ideal orientation relative to the two major components of the bicycle which the rider interacts with, being the handlebars and the pedals of the pedal assembly. Often an elevational adjustment of the handlebars will be provided for to permit a fine tuning of a respective bicycle to a specific rider. These adjustments typically are made while the bicycle is stationary and not in use.

While riding conventional bicycles which do not provide means to move the saddle during usage of the bicycle the rider will rise up off of the saddle repetitively during a ride. Such conventional bicycles severely limit the ability of the rider to remain in contact with the saddle during all riding. This is especially true during sprinting while accelerating, during moderate to steep up grade riding and during moderate to steep down grade riding. During acceleration the rider will rise off the saddle and be supported on the pedals while utilizing the handlebars for balance and, in some cases, pull on the handlebars placing some of the rider's weight on the handlebars. This rising action is to counteract rearward mass transfer and to facilitate greater transfer of power to the pedals. During such acceleration without contact with the saddle the rider will sway back and forth losing a great deal of the energy which is desired to be transferred to the pedal assembly. During uphill riding the rider will typically shift their weight forward on the bicycle either by mere movement along the saddle to an uncomfortable position or by rising off the saddle. During downhill riding the rider will typically shift their weight rearward on the bicycle either by mere movement along the saddle to an uncomfortable position, by rising off the saddle to an elevational position above the saddle or by shifting rearward and actually behind the saddle. When positioned behind the saddle the rider will be suspended above the rear wheel.

While going on steep downhill grades while riding conventional bicycles which do not provide means to lower the saddle the rider is maintained at an elevational height which is too high for such grades. Therefore the rider will not be able to proceed as fast or as safe down such grades as would be available if the rider was seated lower on the bicycle. Additionally, the rider will rise off the saddle when the bicycle encounters a bump or other obstacle.

Many bicycles are specifically designed for specific usage by the rider. A first example include bicycles intended to primarily move the rider along well defined man made or treated surfaces, such as on paved roads, sidewalks or specifically designed running and riding paths. Another example include bicycles intended to primarily move the rider along the natural ground.

It is known to provide some adjustment of the saddle during use of the bicycle. Such adjustment can be manual and controlled by direct mechanical manipulation of some linkage by the rider or automatic and controlled by shifting of the rider's weight. Such adjustment is often awkward and fails to position the rider in an ideal orientation except in certain narrow operating conditions and circumstances. Various U.S. Patents disclose bicycle suspension systems having multiple pivot points positioned about the frame. These include U.S. Pat. No. 5,611,557 by Farris et al. and U.S. Pat. No. 5,725,227 by Mayer. U.S. Pat. No. 5,474,318 by Castellano discloses a frame generally separated into a front frame and a rear frame pivotally connected.

Various deficiencies exist with all conventional bicycles. As can be seen various attempts have been made to provide for the most efficient riding experience utilizing movement of components of the bicycle during usage. These attempts have been less efficient than desired. As such, it may be appreciated that there continues to be a need for a bicycle which automatically adjusts for all circumstances which routinely occur during riding to place the rider in an ideal orientation for maximum efficiency and comfort during each of those circumstances. The present invention substantially fulfills these needs.

SUMMARY

In view of the foregoing disadvantages inherent in the known types of frame adjusting bicycles, your applicant has devised a self adjusting bicycle for a rider having a saddle assembly and structures positioned about a frame of the bicycle to automatically position the saddle within a range of positions depending upon the terrain being ridden over and the body position and exertion level of the rider. The saddle assembly has a saddle to support the rider. The overall range of positions having a neutral position area generally in the middle of the range of positions, a sprinting position area to one end of the range of positions and a downhill position area to the opposing end of the range of positions. The range of positions of the saddle has a range of elevational heights on the self adjusting bicycle, a range of placements along a length of the self adjusting bicycle and a range of angular orientations relative to the ground. While the saddle is within the neutral position area of the overall range of positions the saddle supports the rider in an ideal orientation relative to the self adjusting bicycle while the self adjusting bicycle is being pedaled by the rider along generally even ground at a normal operating speed. While in the neutral position area of the overall range of positions the saddle has a neutral elevational height range within the range of elevational heights and a neutral placement range within the range of placements along the length of the self adjusting bicycle and a neutral angular orientation range within the range of angular orientations relative to the ground. While the saddle is within the sprinting position area of the overall range of positions the saddle supports the rider in an ideal orientation relative to the self adjusting bicycle while the self adjusting bicycle is being pedaled by the rider during acceleration of the self adjusting bicycle. While in the sprinting position area of the overall range of positions the saddle has a sprinting elevational height range within the range of elevational heights and a sprinting placement range within the range of placements along the length of the self adjusting bicycle and a sprinting angular orientation range within the range of angular orientations relative to the ground. The sprinting position area of the overall range of positions places the saddle higher elevationally and further forward along the length of the self adjusting bicycle and at a greater angular orientation than the saddle has while in the neutral position area of the overall range of positions. While the saddle is within the downhill position area of the overall range of positions the saddle supports the rider in an ideal orientation relative to the self adjusting bicycle while the self adjusting bicycle is being ridden by the rider along generally downwardly sloping ground. While in the downhill position area of the overall range of positions the saddle has a downhill elevational height range within the range of elevational heights and a downhill placement range within the range of placements along the length of the self adjusting bicycle and a downhill angular orientation range within the range of angular orientations relative to the ground. The downhill position area of the overall range of positions places the saddle lower elevationally and further rearward along the length of the self adjusting bicycle and at a lesser angular orientation than the saddle has while in the neutral position area of the overall range of positions.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a bicycle which can adjust to position the bicycle in an ideal orientation depending upon the circumstances of operation and the activity of a rider.

Other objects include;

a) to provide for an adjustment of a saddle of the bicycle during operation of the bicycle to maintain the saddle in contact with the rider a majority of the time.

b) to provide for an adjustment of an elevational height of a pedal assembly of the bicycle during operation of the bicycle to provide for optimum transfer of torque created by the rider.

c) to provide for an adjustment of an elevational height of a pedal assembly of the bicycle during operation of the bicycle to provide for improved ground clearance during downhill riding.

d) to provide for the saddle to have a pivotal range of motion within which the saddle may move during operation of the bicycle.

e) to provide for the saddle to have a neutral orientation generally in a middle range of the pivotal range of motion of the saddle during steady pedaling of the bicycle over generally even ground.

f) to provide for the saddle to move into a sprinting orientation being to one end of the pivotal range of motion of the saddle where the saddle moves upward and forward on the bicycle and where an angle of the saddle adjusts to maintain a comfortable contact with the rider when the rider moves to exert a greater pedaling force.

g) to provide for a counteracting of rearward mass transfer by maintaining the rider's contact with the saddle to leverage more of the force of rearward mass transfer to the rear wheel of the bicycle.

h) to provide for the saddle to move into a downhill orientation being to an end of the pivotal range of motion of the saddle where the saddle moves downward and rearward on the bicycle and where and angle of the saddle adjusts to maintain a comfortable contact with the rider when the rider is operating the bicycle on a steep down grade.

i) to provide for multiple pivot points on the bicycle which cooperate to provide for the adjustment of the bicycle to optimize performance and transfer of the energy of the rider to the bicycle depending upon the operating condition of the bicycle and the effort of the rider.

j) to provide for structural adjustment features positioned on the self adjusting bicycle where the self adjusting bicycle may be adjusted for a specific rider.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Many different systems having features of the present invention are possible. The following description describes the preferred embodiment of select features of those systems and various combinations thereof. These features may be deployed in various combinations to arrive at various desired working configurations of systems.

Reference is hereafter made to the drawings where like reference numerals refer to like parts throughout the various views.

The neutral position is the primary position. The self adjusting bicycle will be adjusted to a specific rider while the self adjusting bicycle is in the neutral position. The rider can switch between the neutral position and the climbing position or the sprinting position or the downhill position instantly and effortlessly. Such transfer will dynamically keep the rider in perfect balance and form during a ride on the self adjusting bicycle. With the self adjusting bicycle the rider will feel an extremely linear plush suspension and be able to gobble up the roughest terrains without compromising efficiency, control or performance. It is understood that the positioned defined herein are mere ranges within an overall range of motion and that the self adjusting bicycle smoothly moves within the overall range of motion. It is also understood that the term range of motion does not restrict the present invention to a single pathway, but rather a broad concept of motion with additional adjustments possible at any given point within the range of motion. This is due to the wide ranging suspension which allows for multiple adjustments at any given point depending upon conditions specific to that point in time, The saddles main purpose in the neutral position is to maintain the rider in optimum efficient position maximizing the suspension for extreme comfort. An equilibrium is maintained between the rider and the saddle due to a balanced ratio of the rider's torque, weight distribution and rearward mass transfer keeping the rider in the peak performance threshold. The equilibrium has a threshold that is governed by the amount of torque applied by the rider and or position. The self adjusting bicycle utilizes leveraging forces due to rider's net weight on the saddle and rearward mass transfer and torque and due to rider's gross weight over the pedals and torque and rearward mass transfer.

During most riding the rider will typically utilize a three (3) point contact with the self adjusting bicycle. These points are the saddle, the pedal assembly and the handlebars. While this is true for conventional bicycles, with a self adjusting bicycle having features of the present invention the rider is able to maintain all three contact points during a significantly greater portion of the riding experience. This provides for greater control over the bicycle then available with conventional bicycles.

The feel of the suspension experienced by the rider varies depending upon the positional orientation of the components of the self adjusting bicycle. Much of the movement of the components and the resistance to their respective movement may be adjusted for the specific requirements of a specific rider, or class of riders. For most riders the plushiest, or most absorbent, ride will occur within the neutral position range where the rider will hardly feel those occasions when either wheel encounters something other than a smooth ride, such as a bump or indentation. For most riders a slightly less plush ride will occur within the downhill position range. In this range the suspension of the self adjusting bicycle will isolate most up and down movement from the wheels from being adversely felt by the rider. This will enable the rider to move faster and safer during downhill grade riding than possible with many conventional mountain bicycles. For most riders a stiff ride will occur within the sprinting position range where very little movement of the suspension components of the self adjusting bicycle will occur. This is designed to prevent the power being produced by the rider while pedaling hard from being absorbed by the suspension components of the self adjusting bicycle. This will enable nearly all of the pedaling power produced by the rider to be delivered to rotate the drive wheel of the self adjusting bicycle. While in the downhill position range the rear wheel travel available from the suspension system will be the most available. While in the neutral position range the rear wheel travel available from the suspension system will be slightly less than while in the downhill position range. While in the sprinting position range the rear wheel travel available from the suspension system will be considerably less than while in the neutral position range.

During sprinting the saddle provides the rider a continuous vertical and horizontal support, while transferring lateral forces to the crank. This gives extra power, torque and control for a stronger acceleration rate with zero 'bob' effect. Without switching levers or pushing buttons the rider simply pull forward on the handlebars while cranking down on the pedals. This leverages the rider forward and changes the angle of the saddle and positions the rider in an ergonomic orientation into an aggressive sprinting position. The saddle and suspension instantly stiffens while firmly supporting the rider's weight.

The rearward mass transfer of the rider assists in the adjustment of the self adjusting bicycle conserving a huge amount of the rider's energy for more endurance. The main purpose of the saddle in the sprinting position is to counteract rearward mass transfer of the rider and provide horizontal and lateral support to the rider.

On a conventional mountain terrain bicycle the rider stands up and out of the saddle to sprint forward. The rider's arms and legs are left support and balance the rider's weight and rearward mass transfer. This results in a huge amount of energy loss and then fatigue for the rider.

Ideally the center of gravity of the rider positions more than 95% of the rider's weight over the crank and less than 5% weight on the saddle. The saddle mostly feels the rearward mass transfer force from the rider. Along with hard torque applied by the rider a strong leveraging force is channeled through the linkage arrangements and up to the saddle thus balancing the equilibrium between the rider and the saddle. The angle of the saddle conforms to easily counteract the rearward mass transfer effectively. Rearward mass transfer is directly associated with the amount of torque applied by the rider.

During climbing the geometry of the self adjusting bicycle intuitively changes. The suspension stiffens and the saddle raises forward leveling and positioning the rider over the self adjusting bicycle to maintain perfect traction and eliminate 'bob' effect.

The more torque the rider applies on the pedals the stiffer the saddle configuration becomes. This adjustment keeps the rider firmly supported while in the climbing position. This conserves the rider's energy and provides more control to make the climb easier than ever before.

On conventional mountain terrain bicycles it is typical for the rider to come out of the saddle using some of their energy to keep balanced and centered over the bicycle while at the same time producing power to the crank. On the self adjusting bicycle the saddle's main purpose in the climbing position is to counteract rearward mass transfer from the rider and provide vertical support. Gravity and mass transfer combine with torque applied by the rider to increase the leveraging force to the saddle. The angle of the saddle keeps the rider's center of gravity in front of the rear wheel while counteracting the rider's rearward mass transfer.

During downhill the geometry of the self adjusting bicycle intuitively changes. The saddle lowers to drop the rider to a lower center of gravity while raises the pedal assembly bringing the legs closer to the body. This provides greater handling, stability and higher ground clearances. When entering a downhill grade the rider naturally shifts their weight to the rear. This shift automatically lowers the saddle and changes the suspension configuration for perfect traction in steep terrains.

Conventional mountain terrain bicycles can not provide the rider with the ability to stay seated on most descents. The self adjusting bicycle however makes it possible to stay seated because of the saddle's independency from the frame and rear wheel and the self adjusting features of the present invention.

In the downhill position the saddle's main purpose is to provide support and control. The lack of torque from the rider neutralizes the rearward mass transferring forces. This combined with the rider's weight and positioning lessens the leveraging force to the saddle. As a result this offsets the balance causing the saddle to reposition down and back thus moving the rider's center of gravity rearward. Most of the rider's weight is then distributed to the saddle easily keeping the saddle in a downhill position.

The rider can remain seated on most descents because of the features of the self adjusting bicycle. The self adjusting bicycle is provided with a saddle lock which enables the rider to lock the saddle and prevent it from rising thus enabling the rider to come off the saddle for technical maneuvers or when more counter weight is needed for steep down hill descents.

The saddle lock can have a separate control mechanism which the rider engages during riding. The easiest control is to incorporate control over the saddle lock into one of the brake levers. This enables the rider to apply a light pressure to the rear brake lever and limit upward movement of the saddle. Ideally the saddle will then remained locked after release of the brake lever until the rider returns to the saddle. When the brake lever facilitating locking of the upward movement of the saddle continues to be applied the saddle is able to be lowered by pressure applied by contact with the rider. This unidirectional locking prevents the saddle from moving upward while not limiting further downward displacement. When a brake lever is used preferably the rear brake lever is used.

The saddle instantly self adjusts to changes in the terrain and operating condition of the self adjusting bicycle. These changes keep the rider's mass supported linearly above uneven surfaces. Although connected by the linkage assembly biased by a single shock absorber the saddle and rear wheel are independent from each other and have different suspension principles.

In all instances the saddle is isolated from up and down movement of the rear wheel of the self adjusting bicycle. Therefore the saddle is not effected much by compression or movement travel of the rear wheel. The saddle controls the compression rate applied to the shock absorber which in turn regulates the rear wheel's suspension movement. This continuous fine tuning of the suspension of the rear wheel radically enhances performance of the self adjusting bicycle. The saddle provides a constant support for the rider thus maintaining an even balance of pressure regardless of any rough terrain.

On conventional bicycles in order to achieve maximum efficiency through technical terrains a cyclist instinctively knows to stand on the pedals and rise off the saddle. The rider uses their legs to maintain his mass linearly while keeping balanced, peddling and supporting his own weight, all at the same time. Without the support of the saddle traction and control suffers while riding such conventional bicycles. This results in a huge amount of energy loss and then fatigue for the rider of such bicycles.

The purpose of suspension for all bicycles having suspension features is to absorb bumps, reduce vibration and maintain grip through vertical compliance. Many conventionally known suspension systems rely on some type of additional damping to provide for a more controlled reaction of mass transfer. The purpose of these systems is to move the bicycle forward more efficiently while utilizing less energy from the rider.

Mass transfer happens on all types of bicycles, from road bicycles to full downhill bicycles. Every time acceleration occurs the rider's mass transfers rearward on the bicycle. The rear suspension of the bicycle reacts to this mass transfer by compressing and rebounding with each acceleration. This reaction is also known as 'squat' or 'bob'.

Every rider has a mass. For a rider seated on a bicycle a theoretical point exists just in front of the rider's navel which represents their 'center of mass'. Mass transfer and driving force are not accounted for in most conventionally known suspension systems for bicycles. That is because such suspension systems ignore mass transfer and driving force and therefore the solutions they present fail to react to the mass transfer and driving force. Typically modern suspension systems for bicycles attempt to solve the lost of energy problem by rearranging linkages, adding linkages, multiple pivotal points, lockouts, etc. But mass transfer is not adequately addressed in those systems.

Modern saddle designs have not changed from their purpose in decades. Saddles are currently very effective when riding on level ground but fail to compensate for climbs, sprints and downhills. Such saddle are not designed to handle these riding conditions over grades which are not level. In order to compensate for the design of conventional saddles the rider must leave the saddle to maintain or increase a certain level of efficiency.

The self adjusting bicycle is designed to keep the rider seated throughout any trail conditions. This increases the rider's efficiency and control while taking into account driving force and rearward mass transfer. In fact the self adjusting bicycle uses driving force and rearward mass transfer to provide the most intuitive riding experience ever.

The head tube is a portion of the frame which permits the rider to steer the front wheel utilizing the handlebars. It is conventionally known in the bicycle industry to have specific angular orientations for the head tube specific to the type of terrain the bicycle is intended to be ridden over. On self adjusting bicycles having features of the present invention it is preferred that the head tube angle be adjusted during the automatic adjustment of the self adjusting bicycle. When the head tube angle increases the front wheel moves toward the rear wheel to shorten the distance therebetween. When the head tube angle decreases the front wheel moves away from the rear wheel to lengthen the distance therebetween. Preferably the head tube angle is in a mid range position while the self adjusting bicycle is in the neutral position range with the head tube angle increasing when the self adjusting bicycle moves into the downhill position range and head tube angle decreasing when the self adjusting bicycle moves into the sprinting position range. While these angular changes seem contrary to conventional thinking in the field of bicycle design, especially for the change when moving into the downhill position range, they are ideally suited when considered in light of the other changes taking place to the configuration of the self adjusting bicycle.

Bicycles having features of the present invention will have a suspension system formed by at least components which control the saddle displacement. Additionally, it is desired to have front wheel suspension as conventionally known for certain classes of bicycles. While many arrangements are known and may be utilized simple shock absorbers may be positioned between the front wheel axis and the forward frame of the self adjusting bicycle. Preferably multiple biasing points will be provided which cooperate to maintain the self adjusting bicycle in the proper orientation specific to the moment in time. The shock absorber preferably is the primary biasing member utilized to position the components. Additionally, a secondary biasing member preferably acts to maintain the saddle assembly in a desired orientation relative to the forward frame assembly.

Many bicycles will have suspension systems. Some of these systems act upon both wheels while others act only upon either the rear wheel or only upon the front wheel. A common example involves mechanical structures which permit the rear wheel to move within a range of motion of several inches relative to the frame while being controlled by some motion dampening member. Such movement within the range of motion is primarily intended to be in response to the terrain over which the bicycle is moving. This provides for the frame, and therefore the rider, to be isolated from at least a portion of the movement of the rear wheel during riding. This isolation of transfer of movement of the rear wheel to the rider is extremely desirable during riding over rough terrain or when going over a single obstacle, such as a curb or large branch. Various mechanical structures are known to provide such designs for suspension systems.

A negative side effect of such suspension systems involves what is known in the industry as the 'squatting or bobbing effect' during pedaling of bicycles having such suspension systems. It is understood that such suspension systems will be available to absorb impacts received by the rear wheel. During hard pedaling, even over smooth terrain where the suspension system is not acting to isolate transfer of shocks from the rear wheel to the frame, the suspension system will act in a reverse manner from that intended function. During these occasions the suspension system will react to dampen the movement of the rider during each downward stroke on a respective pedal. This results in the suspension system allowing the frame to move relative to the rear wheel. Unfortunately this prevents the full power of the rider's stroke from being utilized to propel the bicycle. During the transition period from power being delivered to one pedal to the opposing pedal during pedaling the suspension system will provide for a return of the frame relative to the rear wheel to a position which existed prior to the downward stroke of the respective pedal. This arrangement will be repeated during the rider's pedaling. This causes the frame to repetitively move upward and downward relative to the rear wheel. This movement within some portion of the range of motion of the rear wheel relative to the frame wastes power which is desired to have delivered to the propulsion of the bicycle. This results in the rider having to exert more energy to travel than would occur if the suspension system was not wasting power and acting to cause the 'squatting or bobbing effect'.

Various solutions have been proposed to counteract this wasteful movement of the rear wheel relative to the frame during hard pedaling to counteract or eliminate the 'squatting or bobbing effect'. A completely satisfactory solution has not been proposed due to the desire that the suspension system remain fully active and fully capable of providing the desired isolation of shocks, or radical movement of the rear wheel, from being fully transferred to the frame. Therefore, those proposes solutions which mechanically act to restrict normal operation of the suspension system during hard pedaling have not been accepted in the industry as a solution to the 'squatting or bobbing effect'.

Applicant has discovered that the present invention isolates the power of the rider during hard pedaling primary to the crank and, to a much lesser extent, within the frame of the bicycle. At that point there is much less movement of the existing conventional rear wheel suspension system and the rear wheel moves within a vastly narrowed range of motion relative to the frame. This all occurs while the rear wheel suspension system remains fully and completely available at all times to perform its intended function of isolating transfer of shocks and radical movements of the rear wheel relative to the frame. This isolation of pedaling energy being wasted by the suspension system of the bicycle is not limited to travel over smooth ground but is applicable to all operational orientations over all terrain where the rider is pedaling the bicycle.

The adjustments which occur utilizing features of the present invention provide various desired results. The most noticeable is the orientation of the saddle on the bicycle. Other results include changes to the feel of suspension systems deployed on the bicycle. These can be on the rear wheel' alone or on both the rear and front wheels. This is the result of the orientation of components of the bicycle including orientation and weight distribution of the rider. As detailed elsewhere herein the present invention tends to isolate hard pedaling to prevent the rear wheel suspension from releasing the rider's energy through unwanted movement of the rear wheel relative to the frame via movement of these components of the suspension system. The same is true for the front wheel suspension, when deployed. The self adjusting features of the present invention provide for a firmer suspension when a firmer suspension is desired and a softer suspension when a softer suspension is desired.

The present invention provides for movement of the saddle of the bicycle within some range of motion depending upon operating conditions and the placement and orientation of the rider. Preferably the range of motion will be within an arc anchored to some pivot point positioned on a portion of the frame. This arrangement, in combination with other features of the present invention, provides for self adjustment of the bicycle to optimize the configuration of the bicycle to the specific conditions existing at any given moment. Certain embodiments are envisioned which provide for additional movement of the saddle beyond the primary range of motion. One example of this possibility involves providing for additional movement of the saddle relative to the pivot point of the primary range of motion. The pivotal range of motion provides for an elevational movement of the saddle relative to the ground as well as a forward and rearward movement of the saddle along the bicycle. The preferred embodiment of the invention provides for a greater elevational movement than the movement along the length of the bicycle.

While such movements of the preferred embodiment perform all of the desired functions of the present invention, it is possible to provide for additional movement of the saddle in certain situations. Preferably such additional movement of the saddle will provide for a greater movement along the length of the bicycle than the elevational movement of the additional movement of the saddle. It being understood that when elements are utilized to provide for additional movement of the saddle that such movement of the saddle will often occur at the same time as movement of the saddle from the primary adjustment features of the present invention.

A simple track system may be deployed between the saddle and the pivotal portion of the saddle assembly. Such a track system may be linear or have an arc along the glide path. It is possible to have a neutral position, which the saddle is in during normal operation, at any point along a range of motion along the track system. When the neutral position is positioned within the range of motion the saddle may move forward along the length of the bicycle in response to some action or event and may move rearward along the length of the bicycle in response to some action or event. Alternatively, it is possible to have the neutral position at a limit of the range of motion along the track system. In the most preferred embodiment of this feature the neutral position is at a forward most position along the length of the bicycle of the range of motion along the track system. This provides for the saddle to be displaced rearward along the length of the bicycle in response to certain operational conditions, such as during extreme downhill travel.

The sliding action may be completely under the control of the rider. Alternatively, the sliding action may be linked to orientation of the overall adjustment of the self adjusting bicycle. When under the complete control of the rider the rider may cause the displacement merely be applying a forward or rearward pressure to the saddle. Alternatively, the user may manipulate some control member which may merely release the saddle from a locked position along the track system or may control the motion of the saddle along the track system. Various biasing structures may be utilized to control and/or limit movement of the saddle along the track system.

This additional displacement of the saddle can be extremely useful during extreme downhill riding where it is desirable to move the saddle, and therefore the rider, further rearward on the bicycle. Similarly, such additional displacement of the saddle forward can be extremely useful during extreme uphill riding where it is desirable to move the saddle, and therefore the rider, further forward on the bicycle.

A self adjusting bicycle 20 is depicted in the various views. Self adjusting bicycle 20 has a saddle 22 to support a rider, not shown, and means to automatically position saddle 22 in a range of motion. This range of motion is formed by at least a neutral position range 24, see FIG. 13, a sprinting position range 26, see FIG. 12, and a downhill position range 28, see FIG. 14. The automatic adjustment of saddle 22 and other components of self adjusting bicycle 20 are dependant upon an operating condition of self adjusting bicycle 20 and placement and activity of the rider.

For ease of understanding, and to avoid confusion within the various views, all brake components, including levers, cables and application assemblies, have not been depicted in the major views. These components are well known in the art and their removal from the major views have no effect upon the present invention. For the same reasons the shifting assemblies and the shifting cables have not been depicted in the major views. It being understood that operation of self adjusting bicycle 20, including during movement between the various position ranges 24, 26 and 28, will not be adversely impacted by any of the components not depicted in the views and that such automatic adjustment operation of self adjusting bicycle 20 will not adversely impact operation of these components or their systems.

Self adjusting bicycle 20 has, as clearly definable major components, a front wheel assembly 30, a forward frame assembly 32, a rearward frame assembly 34, a saddle assembly 36 and a linkage assembly 38. While the preferred embodiment which follows places certain components on each assemblies 30, 32, 34, 36 or 38 it must be understood that it is possible to move some of these components to other assemblies without altering operation of self adjusting bicycle 20 and without losing the functions and features of the present invention.

Figures 1, 3:
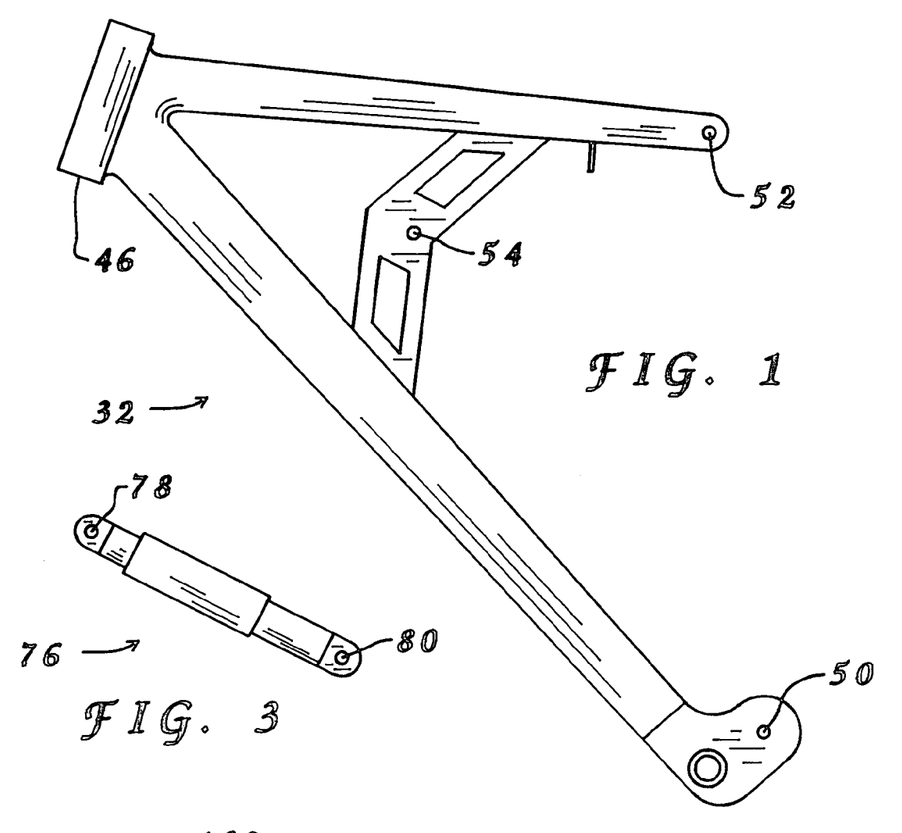
FIG. 1 is a side elevational view of a forward frame assembly.
FIG. 3 is a side elevational view of a shock absorber.

Front wheel assembly 30 has a frame portion 40, a front wheel 42 rotatably attached to frame portion 40 and handlebars 44 attached to frame portion 40. Forward frame assembly 32 has positioned thereon a front wheel assembly pivot connection 46, a pedal assembly 48, a rearward frame assembly pivot connection 50, see FIG. 1, a saddle assembly pivot connection 52, see FIG. 1, and a shock absorber pivot connection 54, see FIG. 1. Pedal assembly 48 has certain teeth 56. Rearward frame assembly 34 has positioned thereon a rear wheel assembly 58, a forward frame assembly pivot connection 60, see FIG. 2, and a linkage assembly pivot connection 62, see FIG. 2. Rear wheel assembly 58 has certain teeth 64. Saddle assembly 36 has saddle 22, a forward frame assembly pivot connection 66, see FIG. 5, and a linkage assembly pivot connection 68, see FIG. 5. Saddle 22 supports the rider at certain times during use of self adjusting bicycle 20. Linkage assembly 38 has a saddle assembly pivot connection 70, see FIG. 6, a rearward frame assembly pivot connection 72, see FIG. 7, and a shock absorber pivot connection 74, see FIG. 6. A shock absorber 76 has a forward frame assembly pivot connection 78, see FIG. 3, and a linkage assembly pivot connection 80, see FIG. 3. Shock absorber 76 is positioned, in the preferred embodiment depicted, to act between forward frame assembly 32 and linkage assembly 38. It is understood that the mechanical action of shock absorber 76 may be positioned to span between various of the assemblies 32, 34, 36 and 38. It is also understood that multiple shock absorbers may be deployed. Shock absorber 76 has adjustment features to permit fine tuning of self adjusting bicycle 20 for a specific rider. Adjustment of securement of shock absorber 76 along forward frame assembly 32 may be provided for. Preferably such adjustment will occur along a slot where an infinite number of positions may be selected. Alternatively such adjustment can occur by selecting securement relative to a fixed number of securement points, such as positioning a number of shock absorber pivot connection 54 on forward frame assembly 32 with a single one selected for pivotally anchoring shock absorber 76. Any such adjustment feature will provide for a fine tuning of self adjusting bicycle 20 to a specific rider.

Front wheel assembly pivot connection 46 of forward frame assembly 32 pivotally mates with frame portion 40 of front wheel assembly 30 to permit the rider to manipulate handlebars 44 to steer self adjusting bicycle 20, as conventionally known in the art. Nothing in this steering coupling is directly related to the present invention and any conventionally known arrangement to mount the front wheel and the handlebars relative to a bicycle frame may be utilized and employed with the present invention.

A chain 82 connects teeth 56 of pedal assembly 48 with teeth 64 of rear wheel assembly 58 to permit rotational force applied by the rider to pedal assembly 48 to be transfer to rear wheel assembly 58, as conventionally known in the art. Any known arrangement of such transfer, with or without utilization of a chain, may be utilized for the present invention.

While pedal assembly 48 is positioned at a rearward extent of forward frame assembly 32 it could be positioned on rearward frame assembly 34. Pedal assembly 48 has a pedal assembly axis 84 extending therethrough.

The art is rich with structural arrangements which permit pivotal movement between two (2) structures about an imaginary pivotal axis while limiting movement of either of the two (2) structures off of the pivotal axis. Many of these arrangements may be utilized with the present invention for any of the various pivotal connections required to practice the invention.

Figures 4, 5, 6, 7:
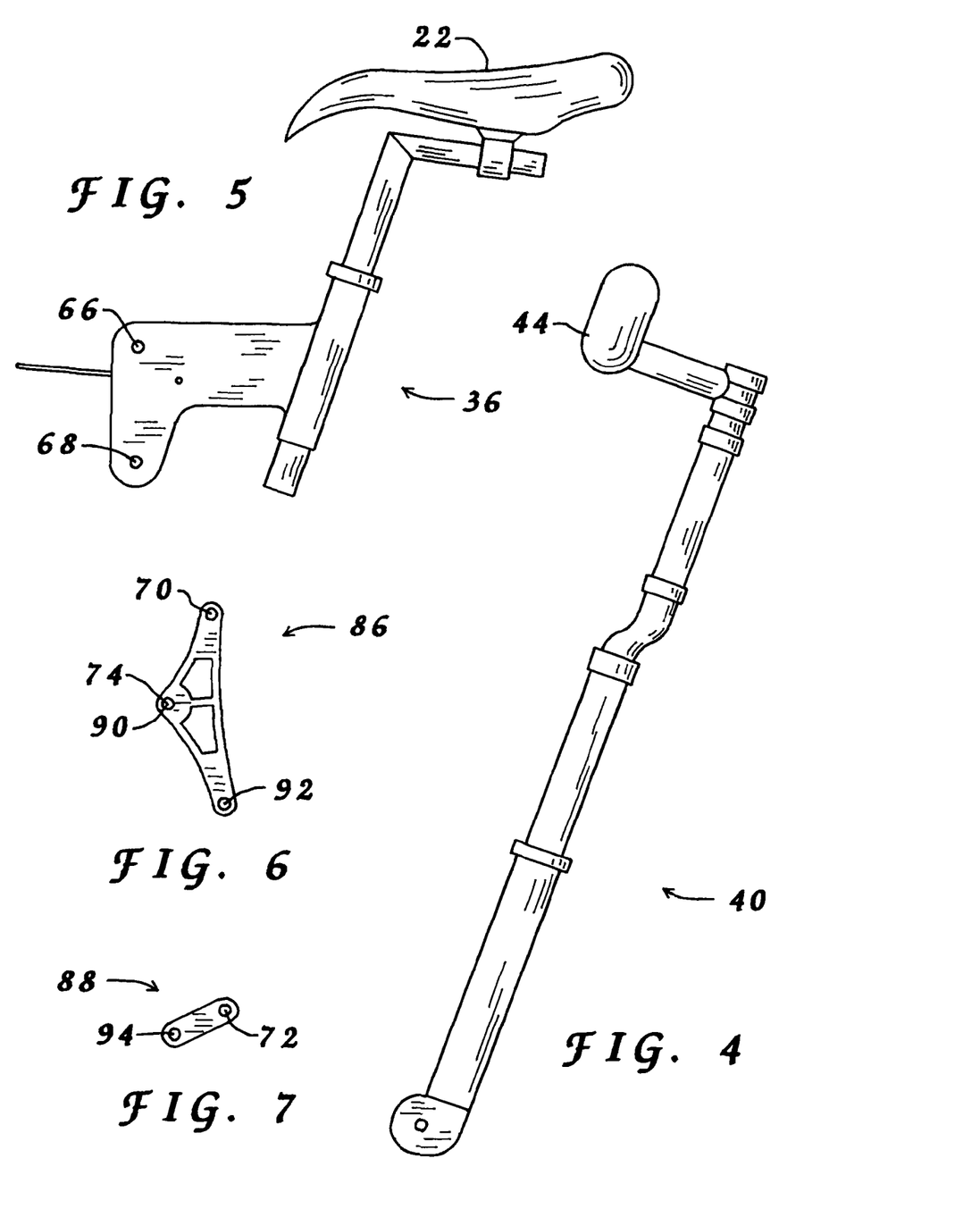
FIG. 4 is a side elevational view of a frame portion.
FIG. 5 is a side elevational view of a saddle assembly.
FIG. 6 is a side elevational view of a first member of a linkage assembly.
FIG. 7 is a side elevational view of a second member of the linkage assembly.

In the embodiment shown in the various views, linkage assembly 38 further has a first member 86, see FIG. 6, and a second member 88, see FIG. 7. First member 86 has positioned thereon saddle assembly pivot connection 70, see FIG. 6, a shock absorber pivot connection 90, see FIG. 6, and an intermediate pivot connection 92, see FIG. 6. Second member 88 has positioned thereon rearward frame assembly pivot connection 72, see FIG. 7, and an intermediate pivot connection 94, see FIG. 7. This provides for a two (2) point pivotal linkage which enhances movement of linkage assembly 38. It is noted that second member 88 is restricted to fairly slight movement.

Figure 11:
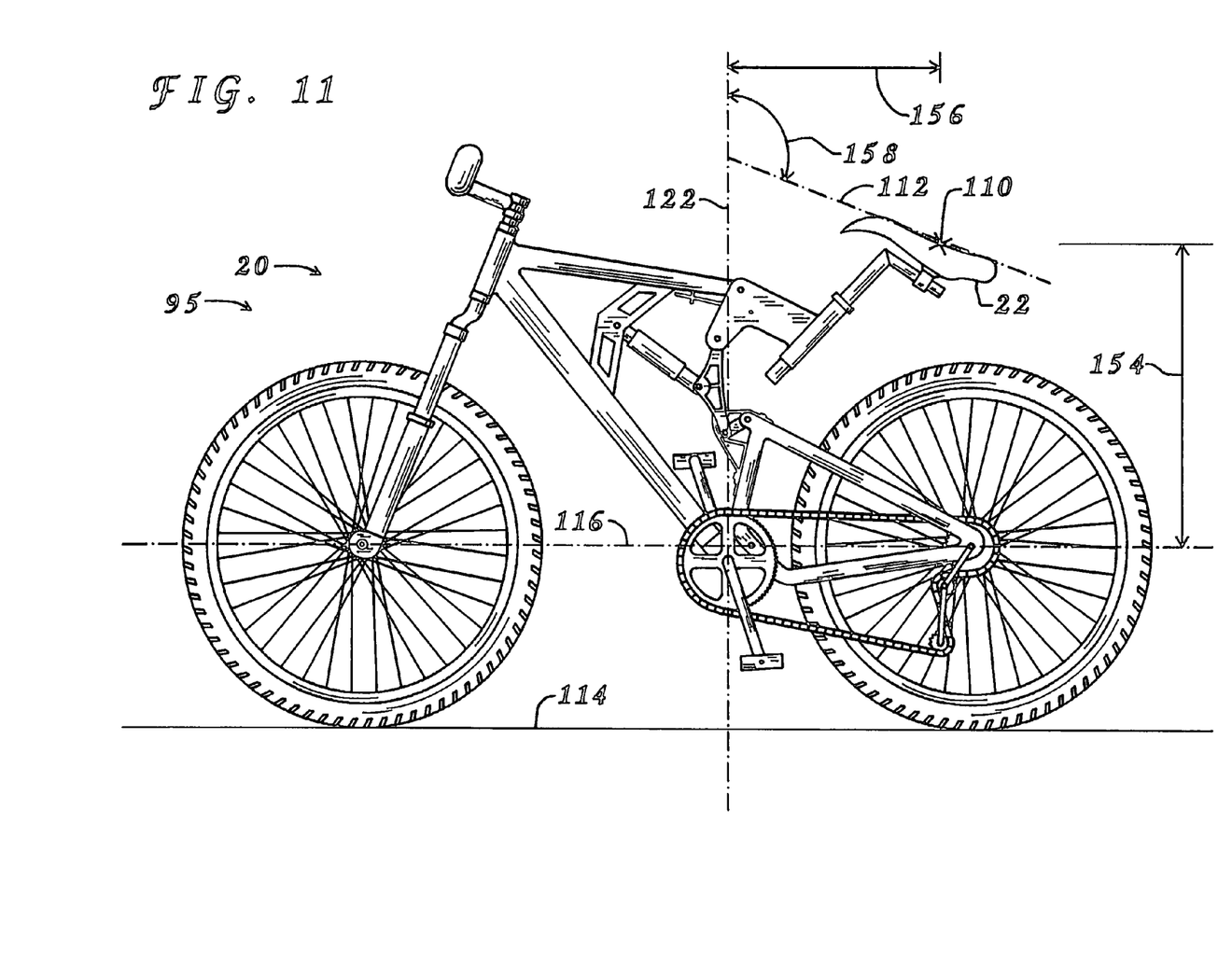

FIG. 11 depicts self adjusting bicycle 20 in a bottomed out position 95. Typically bottomed out position 95 will never be reached during routine operation of self adjusting bicycle 20. This provides for operation of self adjusting bicycle 20 within downhill position range 28 without the rider having to be concerned for any abrupt impact with the downward limit of motion of saddle 22.

The following description details various pivotal connections utilized within construction of a prototype based upon the preferred embodiment. It is understood that elimination of various of the pivotal connections are possible without departing from the present invention as are the addition of various pivotal connections not utilized with the preferred embodiment. It is further understood that movement of the pivotal connections depicted is possible and envisioned including their respective relative locations as well as placement on other components within the overall self adjusting bicycle.

Saddle assembly pivot connection 52 of forward frame assembly 32 and forward frame assembly pivot connection 66 of saddle assembly 36 are pivotally secured together to form a pivot point 96. Rearward frame assembly pivot connection 50 of forward frame assembly 32 and forward frame assembly pivot connection 60 of rearward frame assembly 34 are pivotally secured together to form a pivot point 98. It is noted that pivot point 98 is positioned in close proximity to a pedal assembly axis 84. Linkage assembly pivot connection 62 of rearward frame assembly 34 and rearward frame assembly pivot connection 70 of linkage assembly 38 are pivotally secured together to form a pivot point 100. Linkage assembly pivot connection 68 of saddle assembly 36 and saddle assembly pivot connection 92 of linkage assembly 38 are pivotally secured together to form a pivot point 102. Intermediate pivot connection 72 of first member 86 of linkage assembly 38 and intermediate pivot connection 94 of second member 88 of linkage assembly 38 are pivotally secured together to form a pivot point 104. Shock absorber pivot connection 54 of forward frame assembly 32 and forward frame assembly pivot connection 78 of shock absorber 76 are pivotally secured together to form a pivot point 106. Shock absorber pivot connection 74 of linkage assembly 38 and linkage assembly pivot connection 80 of shock absorber 76 are pivotally secured together to form a pivot point 108. Pivot points 96, 98, 100, 102, 104, 106 and 108 cooperate to enable the self adjusting feature of self adjusting bicycle 20. Shock absorber 76 applies a pressure against linkage assembly 38.

Various measurements of placement of components of self adjusting bicycle 20 follow to explain operation of self adjusting bicycle 20. Saddle 22 is given an imaginary contact point 110, shown in FIG. 8 through FIG. 11, from which measurements are made to various imaginary lines associated with self adjusting bicycle 20. Saddle 22 is given an imaginary contact line 112, shown in FIG. 8 through FIG. 11, from which measurements are made to various imaginary lines associated with self adjusting bicycle 20. During usage self adjusting bicycle 20 will move over ground 114. An imaginary ground corresponding line 116, shown in FIG. 8 through FIG. 11, extends along a length of self adjusting bicycle 20 and passes through a front wheel axis 118 and a rear wheel axis 120. An imaginary length placement line 122, shown in FIG. 8 through FIG. 11, extends perpendicular from imaginary ground corresponding line 116 from pedal assembly axis 84. An imaginary front wheel placement line 124, shown in FIG. 8 through FIG. 10, extends perpendicular from imaginary ground corresponding line 116 from front wheel axis 118. An imaginary rear wheel placement line 126, shown in FIG. 8 through FIG. 10, extends perpendicular from imaginary ground corresponding line 116 from rear wheel axis 120. An imaginary handlebar placement axis 128, shown in FIG. 8 through FIG. 10, passes through a portion of handlebars 44. The description which follows and which utilize FIG. 8 through FIG. 11 places self adjusting bicycle 20 on ground 114 in the same orientation for clarity of understanding of the placement descriptions. It being understood that some conditions, such as while in downhill position range 28, will involve different angular orientations for self adjusting bicycle 20.

The various movements of self adjusting bicycle 20 occur as a result of the placement of the rider including weight distribution, the activity of the rider, the angular orientation of self adjusting bicycle 20 to ground 114, the speed of self adjusting bicycle 20 and a state of acceleration or deceleration of self adjusting bicycle 20, amongst other conditions.

Figures 12, 13, 14:
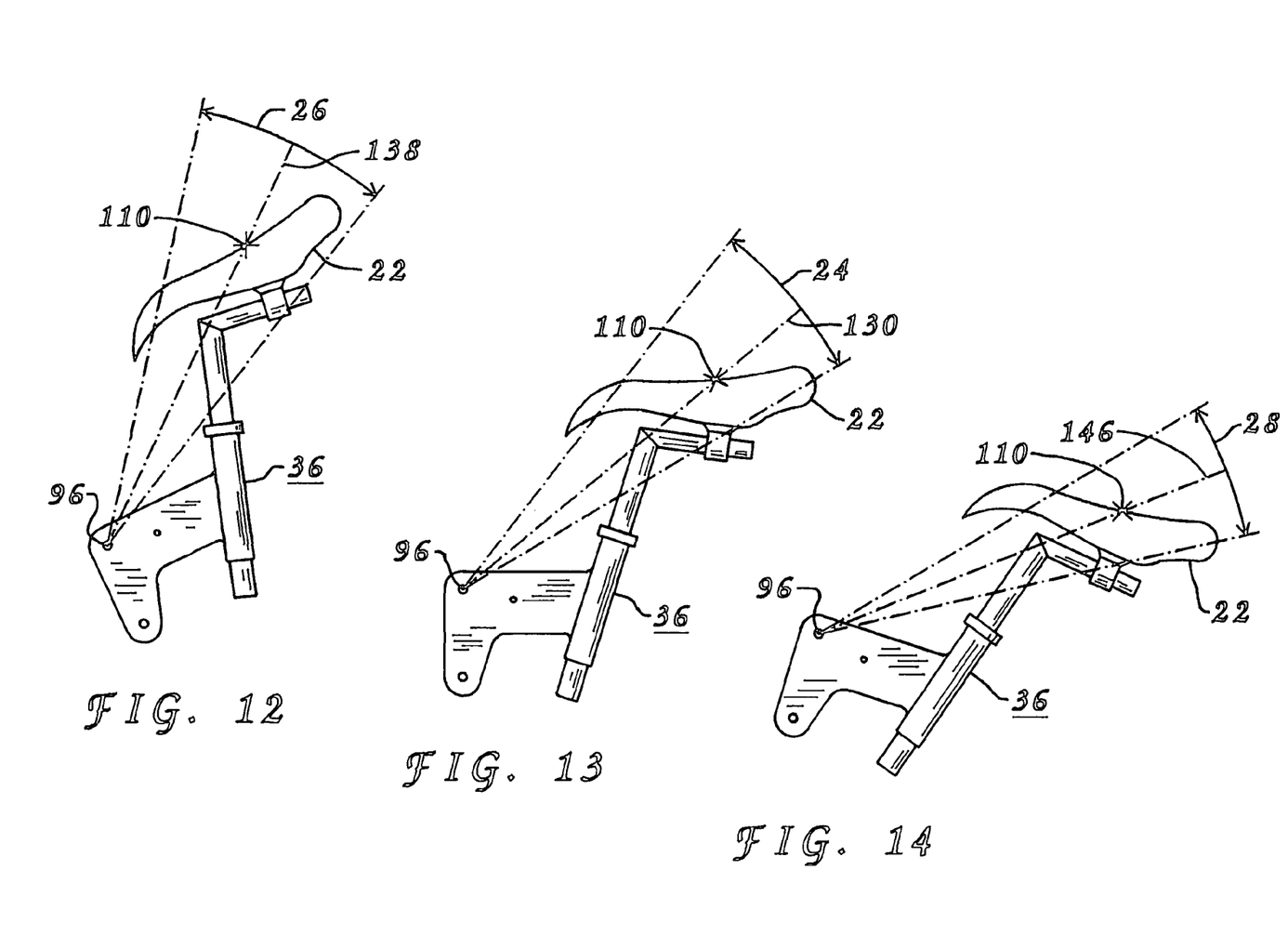
FIG. 12 through FIG. 14 are side elevational views of the saddle assembly depicting various operational ranges.

Self adjusting bicycle 20 positions saddle 22 generally in neutral position range 24, see FIG. 13, to support the rider while self adjusting bicycle 20 is being pedaled by the rider along generally even ground 114 at a normal operating speed. This provides for the rider to be generally maintained relative to saddle 22 during automatic adjustment of self adjusting bicycle 20 within neutral position range 24 in an ideal orientation relative to self adjusting bicycle 20 for movement along even ground 114 at the normal operating speed.

Figure 9:
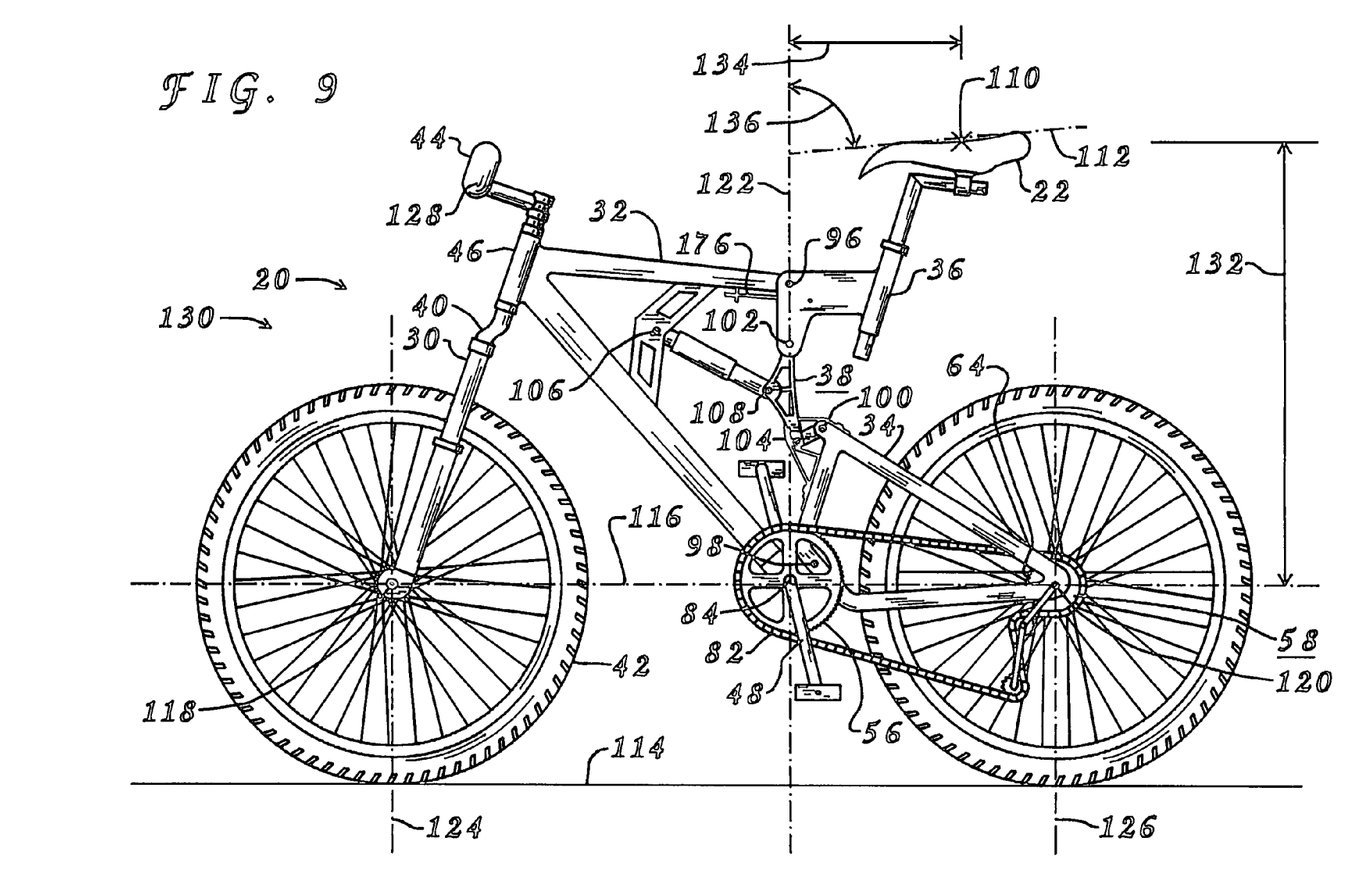

For purpose of explaining principles of the present invention neutral position range 24, see FIG. 13, has an average position 130, depicted in FIG. 9 and FIG. 13. Average position 130 has a placement for saddle 22 and other components of self adjusting bicycle 20. While in average position 130 imaginary contact point 110 of saddle 22 has an elevational height 132 from imaginary ground corresponding line 116 and a placement 134 along a length of self adjusting bicycle 20 as measured from imaginary length placement line 122 and an angular orientation 136 relative to ground 114 as measured from imaginary contact line 112 of saddle 22 relative to imaginary ground corresponding line 116.

Figure 8:
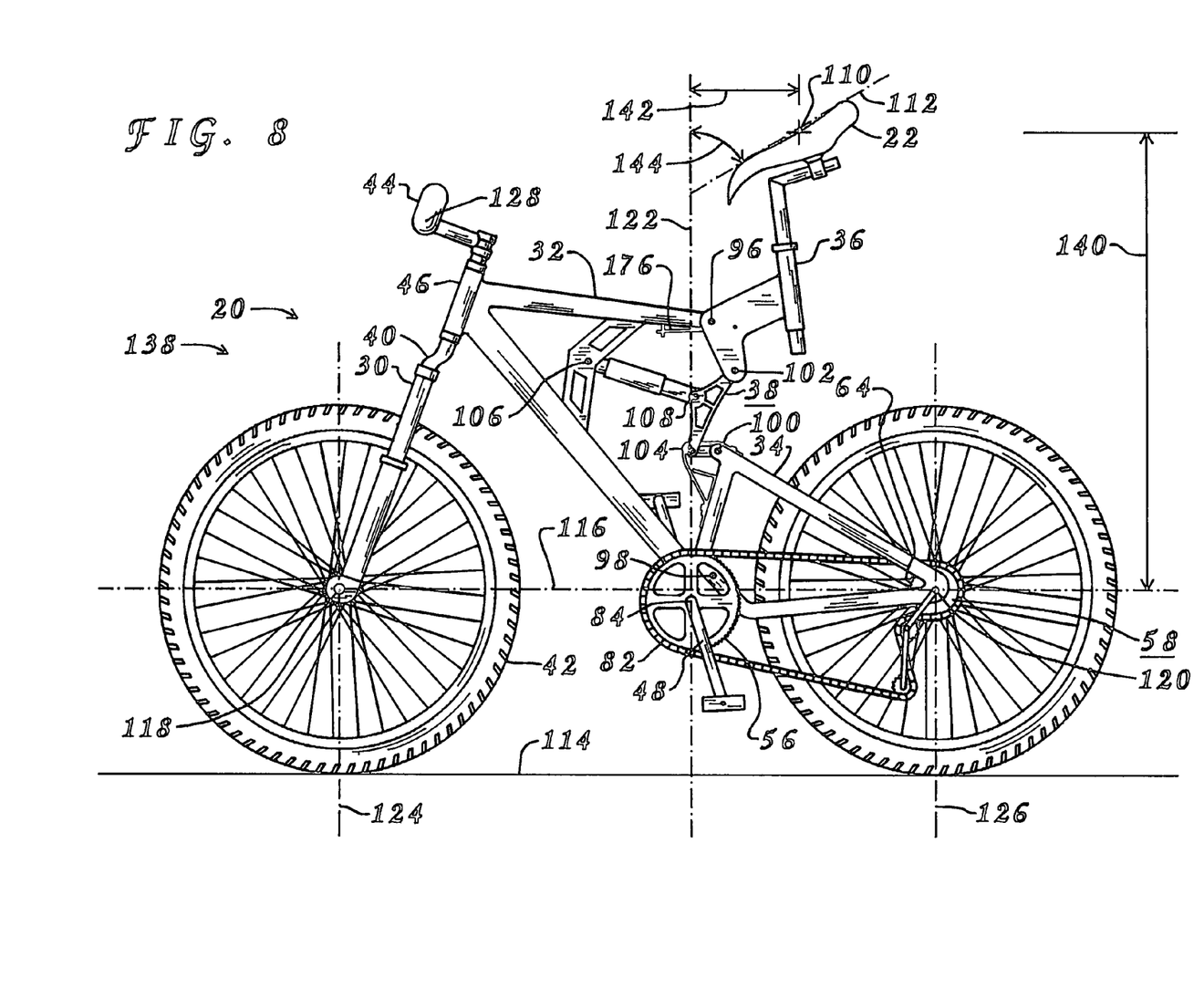
FIG. 8 through FIG. 11 are side elevational views of a self adjusting bicycle in various operational orientations.

For purpose of explaining principles of the present invention sprinting position range 26, see FIG. 12, has an average position 138, depicted in FIG. 8 and FIG. 12. Average position 138 has a placement for saddle 22 and other components of self adjusting bicycle 20. While in average position 138 imaginary contact point 110 of saddle 22 has an elevational height 140 from imaginary ground corresponding line 116 and a placement 142 along a length of self adjusting bicycle 20 as measured from imaginary length placement line 122 and an angular orientation 144 relative to ground 114 as measured from imaginary contact line 112 of saddle 22 relative to imaginary ground corresponding line 116.

Figure 10:
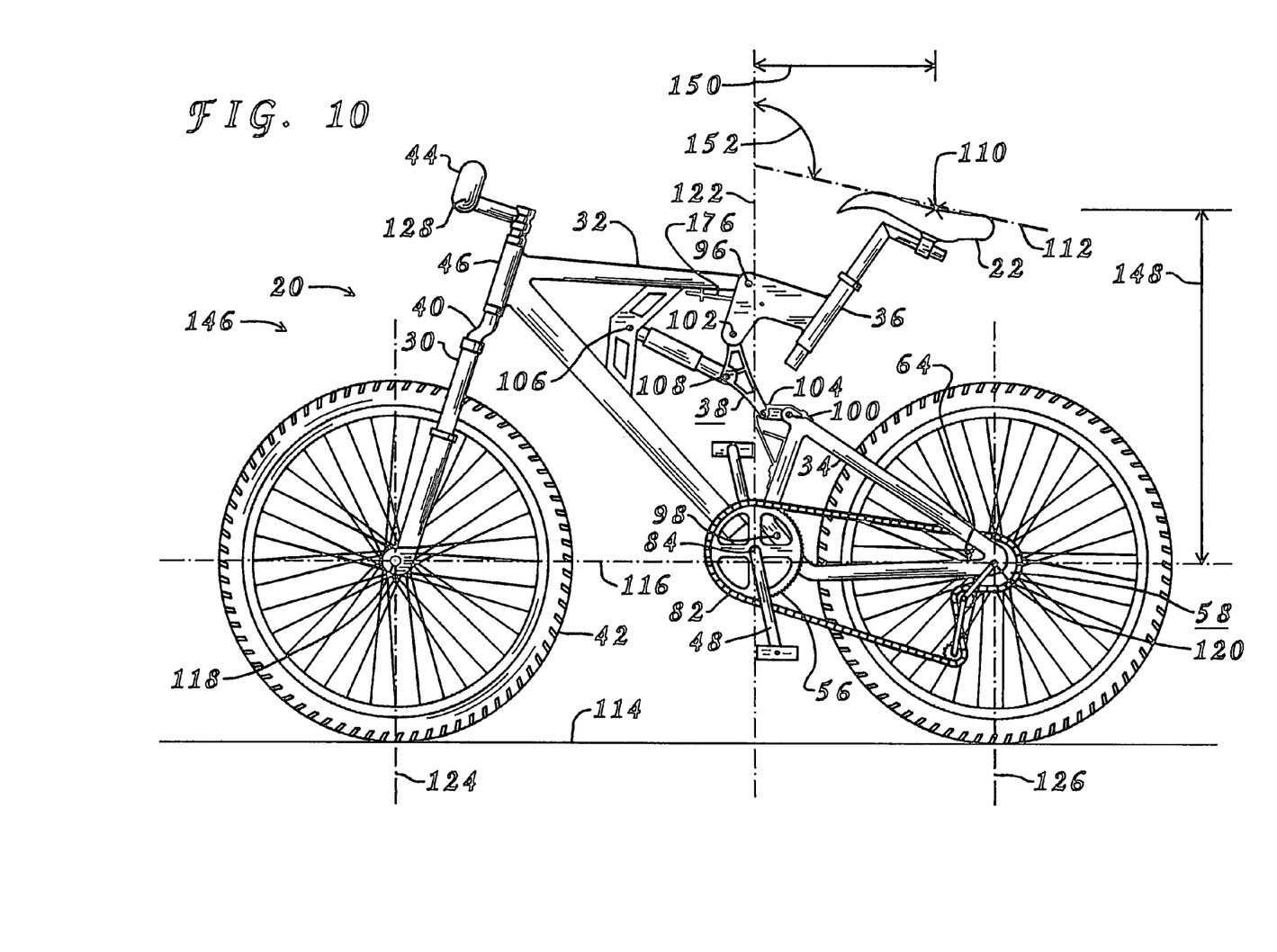

For purpose of explaining principles of the present invention downhill position range 28, see FIG. 14, has an average position 146, depicted in FIG. 10 and FIG. 14. Average position 146 has a placement for saddle 22 and other components of self adjusting bicycle 20. While in average position 146 imaginary contact point 110 of saddle 22 has an elevational height 148 from imaginary ground corresponding line 116 and a placement 150 along a length of self adjusting bicycle 20 as measured from imaginary length placement line 122 and an angular orientation 152 relative to ground 114 as measured from imaginary contact line 112 of saddle 22 relative to imaginary ground corresponding line 116. It is a strong desire that a noticeable threshold exist between each adjacent position range. These thresholds will be noticeable to the rider during movement of self adjusting bicycle 20 between the position ranges. This will provide the rider with a confidence of adjustment by self adjusting bicycle 20 within each position range without undue concern that self adjusting bicycle 20 will inadvertently reconfigure itself to an adjacent position range. Various structural arrangements may be utilized to provide these thresholds. Repositioning of second member 88 of linkage assembly 38 within a range of motion of second member 88 readily provides for these threshold barriers. As depicted in the various views second member 88 may be positioned at one end of the range of motion for sprinting position range and downhill position range while positioned at the opposing end of the range of motion for neutral position range. The breaking of the thresholds occur when second member 88 of linkage assembly 38 repositions within the range of motion.

Reference is now made to average position 130, see FIG. 9, while in neutral position range 24 compared to average position 138, see FIG. 8, while in sprinting position range 26. Elevational height 132 is less than elevation height 140 while placement 134 is more rearward than placement 142 and angular orientation 136 is less than angular orientation 144. This causes the rider to be higher and further forward and at a greater angle while in sprinting position range 26 than while in neutral position range 24. The rider rises up and moves forward while sprinting, as naturally occurs during conventional sprinting, with the benefit of maintaining contact with saddle 22. This contact with saddle 22 supports the rider while eliminating the side to side rocking of the body of the rider which conventionally occurs while sprinting when the rider leaves the saddle. This contact with saddle 22 also provides for the effect of rearward mass transfer to be transferred to the rear wheel of self adjusting bicycle 20. Additionally, saddle 22 supports some of the weight of the rider while sprinting which acts to prevent fatigue by eliminating the requirement that the rider support their entire weight on their legs during conventional sprinting. It is further noted that pedal assembly axis 84 is lowered while in sprinting position range 26 compared to neutral position range 24. This provides for greater range of stroke of legs while in sprinting position range 26 enabling more efficient utilization of force than exists with conventional fixed saddle bicycles. This lowering of pedal assembly axis 84 also provides for center of gravity of the rider to remain low on self adjusting bicycle 20.

Reference is now made to average position 130, see FIG. 9, while in neutral position range 24 compared to average position 146, see FIG. 10, while in downhill position range 28. Elevational height 132 is greater than elevation height 148 while placement 134 is more forward than placement 150 and angular orientation 136 is greater than angular orientation 152. This causes the rider to be lower and further rearward and at a lesser angle while in downhill position range 28 than while in neutral position range 24. The rider is lowered and moves rearward while going downhill. This provides great advantage compared to conventional downhill riding where the rider is limited in their orientation to the bicycle while in the saddle. The rider often will slide back on the saddle during downhill riding on conventional fixed saddle bicycles thus moving to an uncomfortable and awkward placement. Additionally, the rider of such conventional fixed saddle bicycles will have a higher center of balance which makes control of the conventional bicycle more difficult than exists on self adjusting bicycle 22 during downhill riding. Often the rider of conventional fixed saddle bicycles will move off of the saddle during downhill riding and not have any support from the saddle. Many riders of conventional fixed saddle bicycles will position their body behind the saddle during downhill riding in an effort to move their weight rearward and lower their center of gravity. The continued contact with saddle 22 at the lower elevation and at a comfortable angular orientation and at a rearward position vastly enhances downhill riding. Additionally, saddle 22 supports the weight of the rider which transfers more weight to the rear wheel vastly improving traction over that available to conventional fixed saddle bicycles. It is further noted that pedal assembly axis 84 is elevated while in downhill position range 28 compared to neutral position range 24. This provides for more ground clearance of the pedals while in downhill position range 28 giving greater confidence during pedaling downhill than exists with conventional fixed saddle bicycles.

Figure 2:
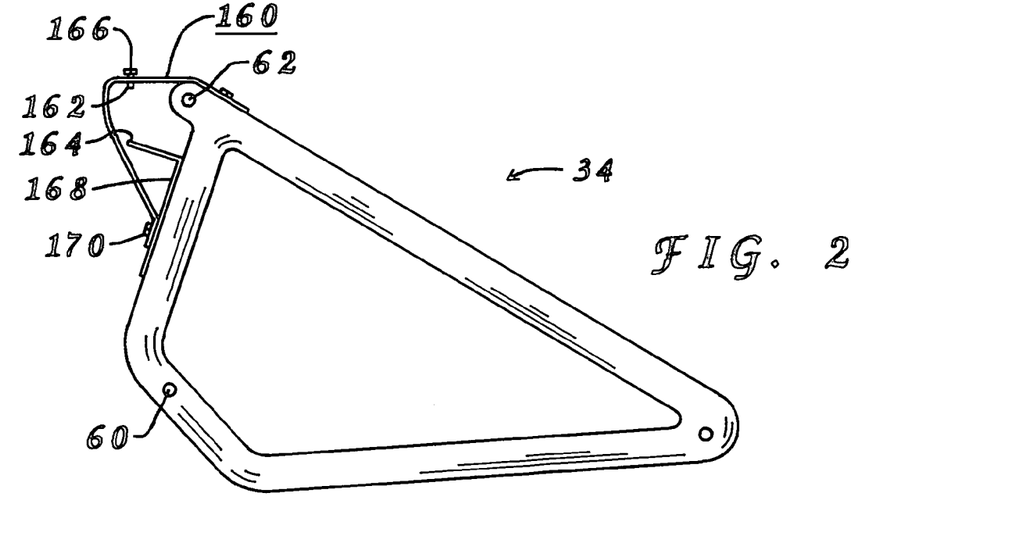
FIG. 2 is a side elevational view of a rearward frame assembly.

Linkage assembly 38 will preferably provide for a restriction of displacement of second member 88, as depicted by a containment assembly 160. Additionally, it is desired that means be provided to permit adjustment of the displacement available to second member 88. FIG. 2 depicts containment assembly 160 having an upper contact point 162 and a lower contact point 164. An adjustment member 166 provides for placement of upper contact point 162 at a desired location relative to containment assembly 160. Lower contact point 164 is positioned on a placement bar 168 which is retained by a securement member 170 at a desired location relative to containment assembly 160. Second member 88 acts, in part, to position first member 86. It being understood that saddle assembly 36 may more freely and naturally move about as desired because of the multiple positioning capabilities of linkage assembly 38.

It is desired that some suspension features be provided for within linkage assembly 38 to provide for a smooth transfer of second member 88 within the range of motion afforded by containment assembly 160. The configuration of placement bar 168, having lower contact point 164 positioned thereon, provides for a spring like reaction to contact to isolate transfer of such contact from being noticed by the rider. Similar suspension properties may be afforded to upper contact point 162.

It is a desire that the self adjusting bicycle be maintained within the neutral position range when the self adjusting bicycle is at rest and does not have a rider positioned thereon. This desire extends to having the self adjusting bicycle reposition itself to be within the neutral position range when the rider gets off of the self adjusting bicycle. To this end a biasing assembly will be positioned on the self adjusting bicycle. Preferably this assembly will be positioned at one of the pivot points to influence the components on opposing sides of the respective pivot point. Obviously, a combination of assemblies may be positioned about the self adjusting bicycle to cooperate to provide the adjustment, including positioning about multiple pivot points. The pivot point between the saddle assembly and the linkage assembly is ideally suited to have the biasing assembly interact with. Self adjusting bicycle will have a natural orientation when at rest due to the gravitational influences of the various components. The biasing assembly may merely act to counter this natural orientation. Preferably the biasing assembly will provide for positioning of self adjusting bicycle at a desired location within the neutral position range by providing opposing pressures directed toward this desired location. These pressures ideally are strong enough to maintain self adjusting bicycle while at rest on the ground and when picked up to be moved about. Obviously these opposing pressures should not be strong enough to adversely affect performance of the self adjusting bicycle.

It is a strong desire that the self adjusting bicycle have adjustment features which permit a fine tuning of the self adjusting bicycle. One of these adjustments include limiting resistance of movement of the various components relative to each other. This is easily provided for by providing control over movement of components on opposing sides of any of the various pivot points. The pivot point between the saddle assembly and the linkage assembly is ideally suited to have this restriction feature positioned at. A simple tightening and loosening mechanism on the structural element forming this pivot point provide for control of the friction resistance to rotation of the components on opposing sides of the pivot point. Ideally this structure will be readily available to the rider for fine tuning of the self adjusting bicycle. A simple wing nut, with self locking features, functions perfectly to fulfill this desire.

Figures 15, 16A, 16B:
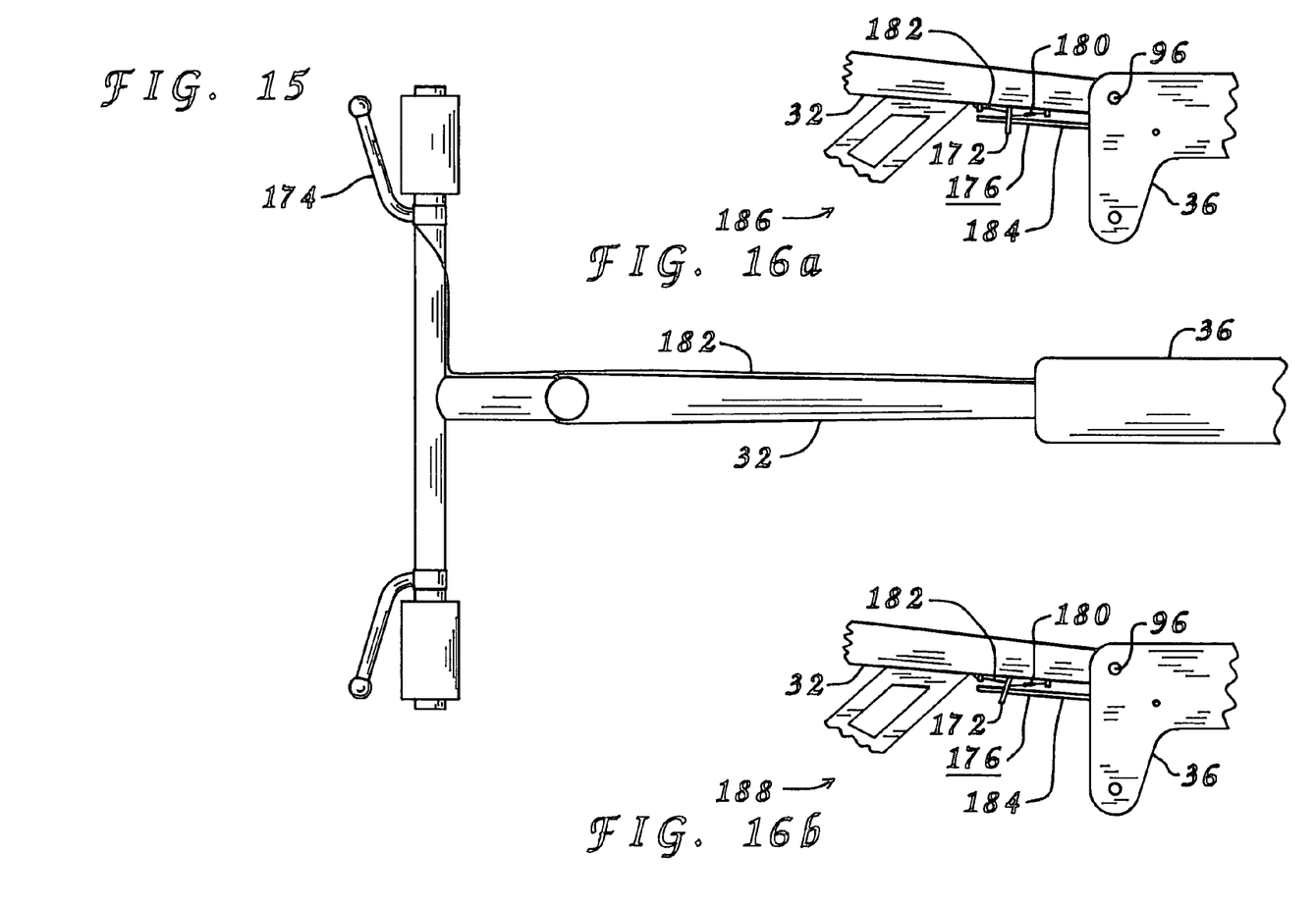
FIG. 15 is a top plan view of a portion of the self adjusting bicycle depicting portions of a saddle lock.
FIG. 16a and FIG. 16b are side elevational views of portions of the saddle lock in opposing positions.

A saddle lock 172, see FIG. 15, FIG. 16a and FIG. 16b, provides for the rider to selectively restrict upward displacement of saddle 22. This provides the rider with the ability to rise off of saddle 22 when desired. Saddle lock 172 is manipulated by the rider engaging rearward brake lever 174. Saddle lock 172 has features to restrict saddle assembly 36 from pivoting significantly relative to forward frame assembly 32 at pivot point 96. Once the rider engages saddle lock 172 and rises off of saddle 22 saddle 22 remains in the locked position until the rider makes contact with saddle 22 again. This is true even after the rider releases rearward brake lever 174. Saddle lock 172 only operates to restrict upward movement of saddle 22. When the rider is engaging rearward brake lever 174 saddle 22 may be further displaced downward and rearward by pressure bearing contact by the rider. While many structures may be utilized to provide for the saddle lock feature, a simple displaceable panel 176 having an aperture, conventionally known and not shown, therethrough and biased by a release spring 180 and controlled by a cable 182 connected to rearward brake lever 174 in combination with an engagement shaft 184 readily provides this feature. When rearward brake lever 174 is engaged displaceable panel 176 is moved from a neutral position 186, see FIG. 16a, to an engaged position 188, see FIG. 16b. When in neutral position 186 engagement shaft 184 moves freely within the aperture of displaceable panel 176. When in engaged position 188 engagement shaft 184 is restricted from being withdrawn from the aperture of displaceable panel 176. When engagement shaft 184 is moved further into the aperture of displaceable panel 176, in the absence of continued engagement of rearward brake lever 174 by the rider, release spring 180 causes release of displaceable panel 176 and engagement shaft 184 may once again freely move within the aperture of displaceable panel 176.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self adjusting bicycle for a rider, the self adjusting bicycle comprising:
   a) a saddle assembly having a saddle to support the rider;
   b) means to automatically position the saddle within a range of positions, the range of positions for the saddle having:
      i) a neutral position area within the range of positions, the neutral position area of the range of positions to support the rider while the self adjusting bicycle is being pedaled by the rider along generally even ground at a normal operating speed wherein the rider is generally maintained relative to the saddle in an ideal orientation relative to the self adjusting bicycle for movement along the even ground at the normal operating speed, the saddle having an elevational height on the self adjusting bicycle while in the neutral position area of the range of positions, the saddle having a placement along a length of the self adjusting bicycle while in the neutral position area of the range of positions, the saddle having an angular orientation relative to the ground while in the neutral position area of the range of positions;

ii) a sprinting position area within the range of positions, the sprinting position area of the range of positions to support the rider while the self adjusting bicycle is being pedaled by the rider during acceleration of the self adjusting bicycle wherein the rider is generally maintained relative to the saddle in an ideal orientation relative to the self adjusting bicycle during acceleration of the self adjusting bicycle and wherein the saddle while in the sprinting position area of the range of positions is elevationally higher than the elevational height of the saddle while in the neutral position area of the range of positions and wherein the saddle while in the sprinting position area of the range of positions is forward on the self adjusting bicycle from the placement of the saddle along the length of the self adjusting bicycle while in the neutral position area of the range of positions and wherein the saddle while in the sprinting position area of the range of positions has a greater angular orientation relative to the ground than the angular orientation of the saddle while in the neutral position area of the range of positions;

iii) a downhill position area within the range of positions, the downhill position area of the range of positions to support the rider while the self adjusting bicycle is ridden by the rider along generally downwardly sloping ground wherein the rider is generally maintained relative to the saddle in an ideal orientation relative to the self adjusting bicycle for movement along the downwardly sloping ground and wherein the saddle while in the downhill position area of the range of positions is elevationally lower than the elevational height of the saddle while in the neutral position area of the range of positions and wherein the saddle while in the downhill position area of the range of positions is rearward on the self adjusting bicycle from the placement of the saddle along the length of the self adjusting bicycle while in the neutral position area of the range of positions and wherein the saddle while in the downhill position area of the range of positions has a lesser angular orientation relative to the ground than the angular orientation of the saddle while in the neutral position area of the range of positions.

2. The self adjusting bicycle defined in claim 1 further comprising a forward frame assembly and a pivot point between the forward frame assembly and the saddle assembly and wherein the means to automatically position the saddle within a range of positions utilize the pivot point between the froward frame assembly and the saddle assembly.

3. The self adjusting bicycle defined in claim 1 wherein the means to automatically position the saddle within a range of positions utilize a two point pivotal linkage.

4. The self adjusting bicycle defined in claim 3 wherein the means to automatically position the saddle within a range of positions utilize a swing bar anchoring the two point pivotal linkage to a frame assembly of the self adjusting bicycle.

5. The self adjusting bicycle defined in claim 1 wherein the means to automatically position the saddle within a range of positions utilize a shock absorber.

6. The self adjusting bicycle defined in claim 5 wherein the shock absorber provides for application of a resistance to a two point pivotal linkage.

7. The self adjusting bicycle defined in claim 1 wherein the means to automatically position the saddle within a range of positions utilize a pivot coupling between a forward frame assembly and a rearward frame assembly.

8. The self adjusting bicycle defined in claim 7 wherein the pivot coupling between the forward frame assembly and the rearward frame assembly is positioned in close proximity to a pedal axis.

9. The self adjusting bicycle defined in claim 1 wherein the neutral position area within the range of positions neutral position area within the range of positions generally positions a pedal axis at a neutral pedal axis position relative to the ground and wherein the downhill position area within the range of positions provides for a raising of the pedal axis relative to the ground higher than when in the neutral pedal axis position.

10. The self adjusting bicycle defined in claim 1 wherein the neutral position area within the range of positions generally positions a pedal axis at a neutral pedal axis position relative to the ground and wherein the sprinting position area within the range of positions provides for a lowering of the pedal axis relative to the ground lower than when in the neutral pedal axis position.

11. A self adjusting bicycle comprising:
   a) a front wheel assembly having handlebars and carrying a front wheel;
   b) forward frame assembly having rotationally attached thereto the front wheel assembly;
   c) rearward frame assembly carrying a rear wheel;
   d) a rotational pedal assembly to provide rotational power to one of the wheels;
   e) a saddle assembly having a saddle;
   f) a saddle assembly pivot connection;
   g) a main pivot connection between forward frame assembly and rearward frame assembly;
   wherein the forward frame assembly and the rearward frame assembly and the saddle assembly have a neutral position range during routine operation of the self adjusting bicycle at a stable speed and momentum along a generally level surface and wherein the forward frame assembly and the rearward frame assembly pivots at the main pivot connection and move toward one another when the rider shifts their weight forward during operation of the self adjusting bicycle while the saddle assembly simultaneously pivots at the saddle assembly pivot connection and moves the saddle upward and forward to support the rider.

12. The self adjusting bicycle defined in claim 11 wherein the forward frame assembly and the rearward frame assembly pivots at the main pivot connection and move away from one another when the rider shifts their weight rearward during operation of the self adjusting bicycle while the saddle assembly simultaneously pivots at the saddle assembly pivot connection and moves the saddle rearward and downward to support the rider.

13. The self adjusting bicycle defined in claim 11 further comprising means to lock the saddle assembly in a stationary orientation where rider may lift off the saddle of the saddle assembly.

14. The self adjusting bicycle defined in claim 11 further comprising means to adjust a height of the saddle of the saddle assembly.

15. The self adjusting bicycle defined in claim 11 further comprising means to adjust a placement of the saddle of the saddle assembly along the self adjusting bicycle.

16. The self adjusting bicycle defined in claim 11 further comprising a dual position pivotal coupling between the forward frame assembly and the rearward frame assembly, the dual position pivotal coupling controlling a pivotal movement of the saddle assembly, the dual position pivotal coupling having a first orientation and a second orientation.

17. The self adjusting bicycle defined in claim 11 further comprising a first bias linkage and second bias linkage both positioned between the forward frame assembly and the rearward frame assembly, the first bias linkage and the second bias linkage cooperating to control a pivotal movement of the saddle assembly.

18. The self adjusting bicycle defined in claim 17 further comprising a shock absorber secured relative to the forward frame assembly and the first bias linkage to regulate movement of the first bias linkage.

19. The self adjusting bicycle defined in claim 17 wherein the second bias linkage generally is maintained in either a first orientation or in a second orientation with transfer between the first orientation and the second orientation.

20. The self adjusting bicycle defined in claim 11 further comprising means to maintain continuous contact of a rider with the saddle of the saddle assembly during routine operation of the self adjusting bicycle.

* * * * *